United States Patent
Mohammed et al.

(10) Patent No.: US 9,664,858 B2
(45) Date of Patent: May 30, 2017

(54) OPTICAL PHOTONIC CIRCUIT COUPLING

(71) Applicant: Intel Corporation, Santa Clara, CA (US)

(72) Inventors: Edris M. Mohammed, Beaverton, OR (US); Peter L. Chang, Portland, OR (US); Ibrahim Ban, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 13/721,965

(22) Filed: Dec. 20, 2012

(65) Prior Publication Data
US 2014/0177995 A1 Jun. 26, 2014

(51) Int. Cl.
*G02B 6/36* (2006.01)
*G02B 6/122* (2006.01)
(Continued)

(52) U.S. Cl.
CPC ......... *G02B 6/36* (2013.01); *G02B 6/12002* (2013.01); *G02B 6/12004* (2013.01);
(Continued)

(58) Field of Classification Search
None
See application file for complete search history.

(56) References Cited

U.S. PATENT DOCUMENTS

| | | |
|---|---|---|
| 2002/0051599 A1 | 5/2002 | Tsukamoto et al. |
| 2005/0053319 A1 | 3/2005 | Doan |

(Continued)

FOREIGN PATENT DOCUMENTS

| | | |
|---|---|---|
| EP | 1816498 A1 | 8/2007 |
| JP | 2009-090162 A | 4/1997 |
| WO | 2011037742 A2 | 3/2011 |

OTHER PUBLICATIONS

Parekh et al. Electrical, Optical and Fluidic Through-Silicon Vias for Silicon Interposer Applications, Jun. 3, 2011, Electronic Components and Technology Conference 2011, pp. 192-198.*

(Continued)

*Primary Examiner* — Ryan Lepisto
*Assistant Examiner* — Erin Chiem
(74) *Attorney, Agent, or Firm* — Jordan IP Law, LLC

(57) ABSTRACT

Systems and methods may couple on-chip optical circuits to external fibers. An SOI waveguide structure may include mirror structures and tapered waveguides to optically couple optical circuits to fibers in a vertically oriented external connector. The mirror structure(s) may be angularly disposed at the ends of the silicon waveguide structure. An oxide layer may cover a buried oxide layer and the silicon waveguide structure. The tapered waveguide(s) may have a narrow end and a wide end. The narrow end of the tapered waveguide(s) may be disposed above the mirror structures. The tapered waveguide(s) may extend through the oxide layer from the narrow end in a direction perpendicular to the silicon waveguide structure. An external connector may fit over the tapered waveguide(s) and uses a fiber array traveling through a connector body to optically couple to the external fiber.

14 Claims, 18 Drawing Sheets

(51) Int. Cl.
  *G02B 6/42* (2006.01)
  *G02B 6/12* (2006.01)
  *G02B 6/132* (2006.01)
  *G02B 6/32* (2006.01)

(52) U.S. Cl.
  CPC ......... *G02B 6/1228* (2013.01); *G02B 6/4214* (2013.01); *G02B 6/132* (2013.01); *G02B 6/32* (2013.01); *G02B 2006/12176* (2013.01); *G02B 2006/12195* (2013.01)

(56) References Cited

U.S. PATENT DOCUMENTS

| | | |
|---|---|---|
| 2006/0067607 A1 | 3/2006 | Fang et al. |
| 2007/0019899 A1* | 1/2007 | Ohtsu et al. ......... G02B 6/4214 385/14 |
| 2007/0085215 A1* | 4/2007 | Budd et al. .................. 257/778 |
| 2008/0044133 A1 | 2/2008 | Degroot et al. |
| 2010/0178006 A1 | 7/2010 | Nishimura et al. |
| 2011/0076028 A1 | 3/2011 | Griebenow et al. |
| 2011/0123149 A1 | 5/2011 | Hemenway, Jr. et al. |
| 2011/0299808 A1 | 12/2011 | Matsuoka et al. |
| 2012/0001166 A1* | 1/2012 | Doany et al. ................... 257/43 |
| 2013/0156366 A1* | 6/2013 | Raj ....................... G02B 6/1228 385/14 |
| 2014/0328596 A1* | 11/2014 | Mathai ................. G02B 6/4245 398/116 |

OTHER PUBLICATIONS

Zubel et al., "Silicon anisotropic etching in alkaline solutions III: On the possibility of spatial structures forming in the course of Si(100) anisotropic etching in KOH and KOH + IPA solutions," Sensors and Actuators 84 (Aug. 2000), pp. 116-125.
Chen et al., "UV Excimer Laser Drilled High Aspect Ration Submicron Via Hole," Applied Surface Science 256 (Jul. 2009), pp. 183-186.
Nieto et al., "Laser direct-write technique for fabricating microlens arrays on soda-lime glass with a Nd:YVO4 laser," Applied Optics, vol. 49, Issue 26, pp. 4979-4983 (Sep. 2010). Abstract Only.
International Search Report and Written Opinion received for PCT Patent Application No. PCT/US2013/047782, mailed on Oct. 14, 2013, 12 pages.
International Preliminary Report on Patentability for PCT Application PCT/US2013/047782, mailed Jul. 2, 2015, 9 pages.
European Search Report for EP Patent Application No. 13865422.3, mailed Oct. 31, 2016, 9 pages.

* cited by examiner

OPTICAL PHOTONIC CIRCUIT COUPLING

BACKGROUND

Embodiments generally relate to efficient optical coupling of Si waveguides on SOI based Planar Lightwave Circuits (PLC) to optical fibers for external transmission.

Efficient optical coupling to and from on-chip photonic single mode (SM) waveguides to an external fiber may be difficult due to the mismatch in size between the SM waveguide and the fiber. For example, the dimension of a typical Silica fiber is approximately forty times larger than a Si channel waveguide. Because of this size mismatch, if the SM waveguide and the fiber are directly coupled, the respective modes of the waveguide and fiber may not couple efficiently yielding only negligible transmission or resulting in an unacceptable insertion loss, >20 dB. Therefore, there is a need for a mechanism to bring these mode sizes close to each other to effectuate efficient coupling.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments of the present invention may enable efficient optical coupling of Si waveguides on SOI based Planar Lightwave Circuits (PLC) to external optical fibers. An SOI waveguide structure includes mirror structures and tapered waveguides may optically couple optical circuits to fibers in a vertically oriented external connector. An external connector may fit over the tapered waveguide(s) and use a fiber array traveling through a connector body to optically couple to the external fiber.

Figure 1:
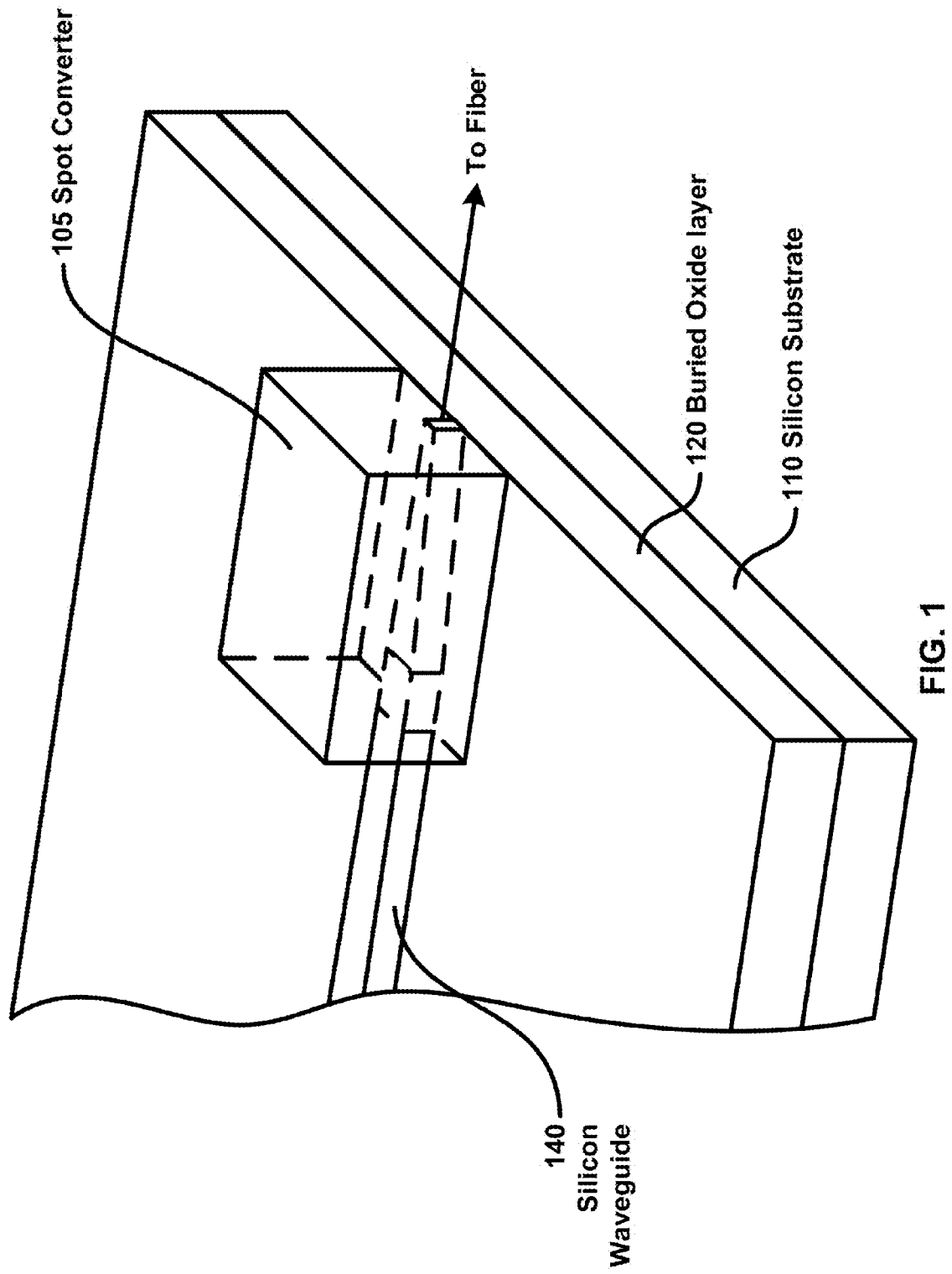
FIG. 1 is a diagram of an example spot converter.

FIG. 1 shows an example of off-chip coupling to a fiber from a silicon on insulator (SOI) on-chip waveguide. Silicon on insulator (SOI) technology refers to the use of a layered silicon-insulator-silicon substrate in place of conventional silicon substrates in semiconductor manufacturing, especially microelectronics, to reduce parasitic device capacitance, thereby improving performance. SOI-based devices differ from conventional silicon-built devices in that the silicon junction is above an electrical insulator, typically silicon dioxide. Those skilled in the art will recognize, however, that other materials may be used such as sapphire.

Specifically, FIG. 1 shows an example Spot size converter configured to couple a silicon (Si) waveguide on a PLC chip to an external fiber. A PLC chip may include an insulating buried oxide layer 120 disposed upon a silicon substrate 110. The spot size converter (SSC) may be fabricated horizontally at the edge of a PLC as shown in FIG. 1. The SSC 105 may receive the optical signal from the Si inverted taper and expands the mode field diameter (MFD) of the Si waveguide 140 to match the fiber MFD or vice-versa.

In FIG. 1 the illustrated Si waveguide is laterally tapered at the end. The tapering helps to squeeze out and evanescently couple the optical signals to the large waveguide (polymer, SixOy or other), which may in turn couple the optical signals to an external fiber for off-chip input/output coupling. Depending on the size of the large waveguide, the external fiber may employ a microlens to further reduce the beam size.

FIG. 2 through FIG. 5 are diagrams of example on-chip optical coupling apparatuses according to aspects of various embodiments of the present invention. As illustrated in the example, the apparatus includes a silicon substrate 110, a buried oxide layer 120, a silicon waveguide structure(s) 241 and/or 242, mirror structures 251 and/or 252, an oxide cladding 230, and tapered waveguides 261 and/or 262. The buried oxide layer 120 may be disposed upon the silicon substrate 110. The silicon waveguide structure(s) 241 and/or 242 may be disposed on the buried oxide layer 120. Mirror structure(s) 251 and/or 252 may be angularly disposed at the ends of the silicon waveguide structure(s) 241 and/or 242. The oxide cladding 230 may cover the buried oxide layer 120 and the silicon waveguide structure(s) 241 and/or 242. The tapered waveguide(s) 261 and/or 262 may have a narrow end and a wide end. The narrow end of the tapered waveguide(s) 261 and/or 262 may be disposed above the mirror structure(s) 251 and/or 252. The tapered waveguide(s) 261 and/or 262 may extend through the oxide cladding 230 from the narrow end in a direction perpendicular to the silicon waveguide structure(s) 241 and/or 242.

According to some of the various embodiments, the photonic chip may include components 290 such as transmitters (lasers, modulators etc.), receivers or other optical elements. At least some of these components 290 may be aligned with the silicon waveguide structure(s) 241 and/or 242. Components 290 may be passive and/or active photonic components such as couplers, arrayed waveguide gratings, modulators, lasers and photo-detectors.

Figure 2:
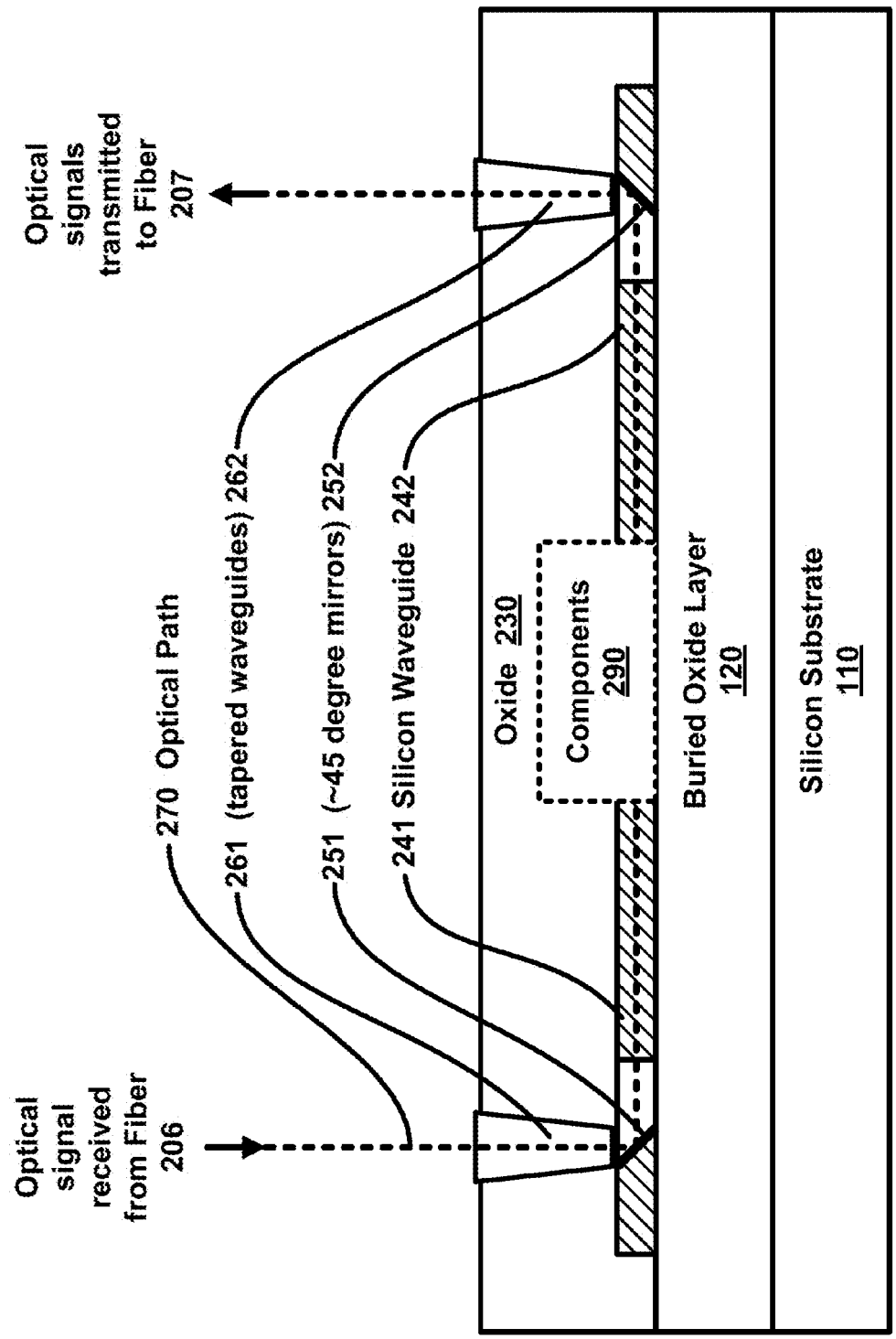
FIGS. 2-5 are diagrams of example on-chip optical coupling devices according to aspects of various embodiments of the present invention.
Figure 3:
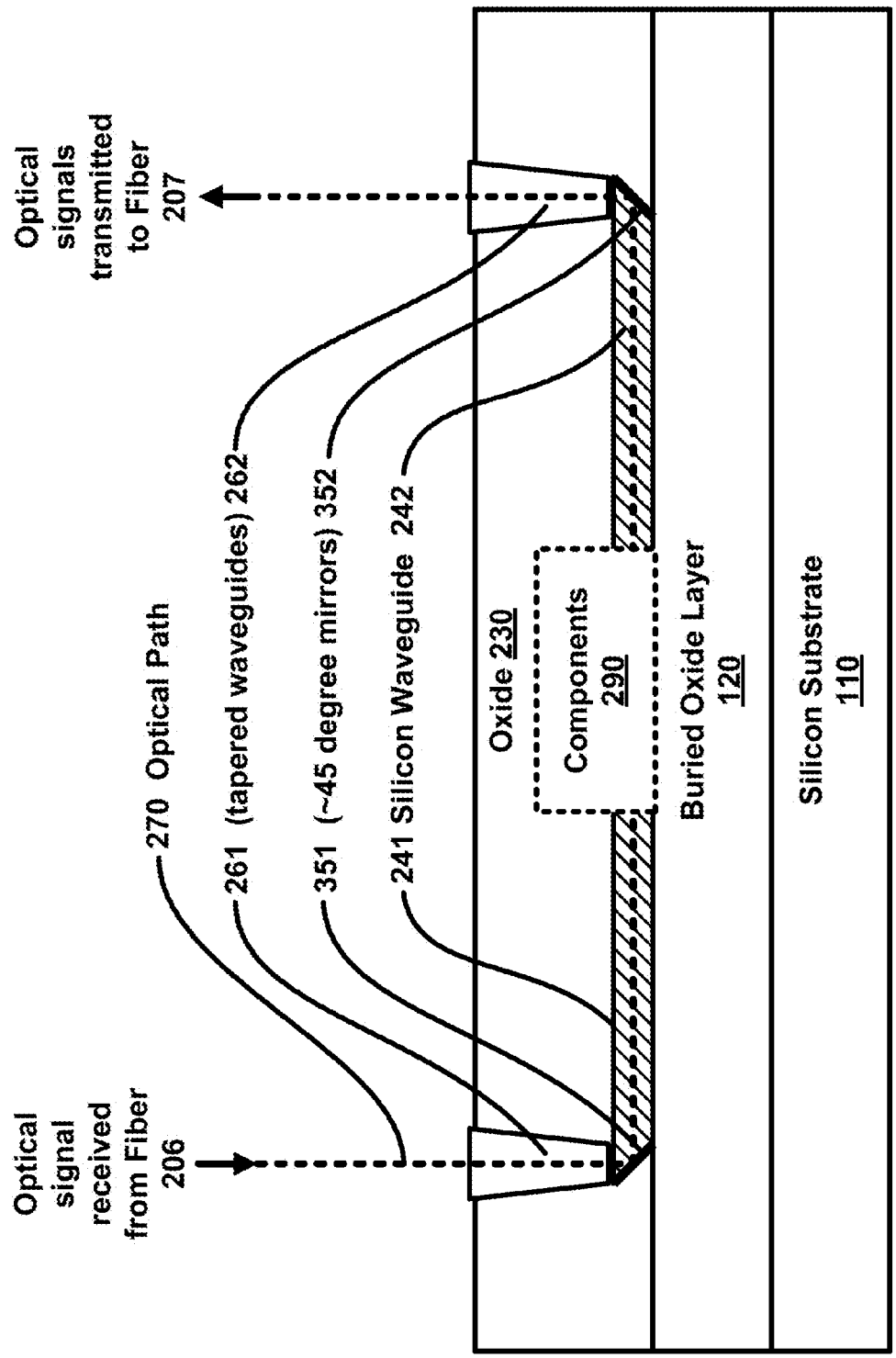

Waveguide mirror(s) 251 and 252 may be disposed at approximately forty-five degrees. FIG. 2 illustrates external mirror(s) 251 and 252. In contrast, FIG. 3 shows an alternative embodiment where total internal reflection (TIR) mirror(s) 351 and 352 may be used. According to some embodiments, various types of mirror may be used in the same device. It is envisioned, that other mirror structures may be used in conformance with the present invention as long as the mirror has the capability of reflecting light signals. Mirrors 251, 252, 351 and 352 may be formed using Si orientation etching. Si orientation etching is described in I. Zubel, "Silicon anisotropic etching in alkaline solutions III: On the possibility of spatial structures forming in the course of Si (100) anisotropic etching in KOH and KOH+IPA solutions," Sens. Actuators A Phys. 84(1), 116-125 (2000). The function of the 45 degree mirrors is to turn the optical signals from vertical to horizontal or vice versa. These mirrors could be either external mirrors 450 or total internal reflection (TIR) mirrors 550. In the case of external mirrors, the Si surface may need to be metalized.

Figure 6A:
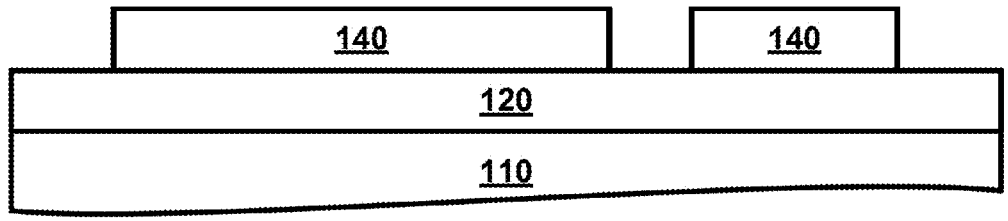
FIGS. 6-9 are diagrams illustrating example process flows for fabricating an silicon on insulator optical coupling system using tapered vertical waveguides according to aspects of various embodiments of the present invention.
Figure 6B:
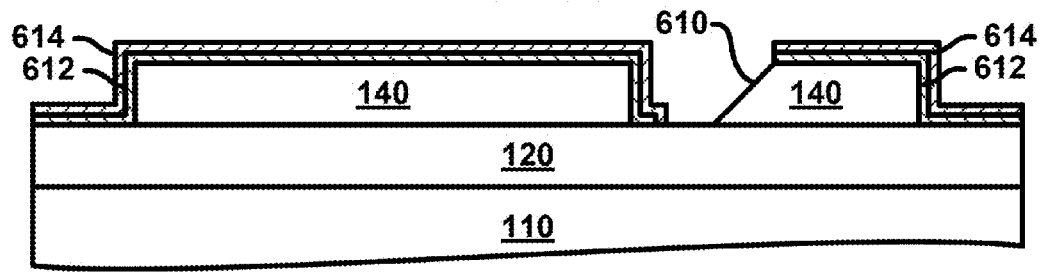
Figure 6C:
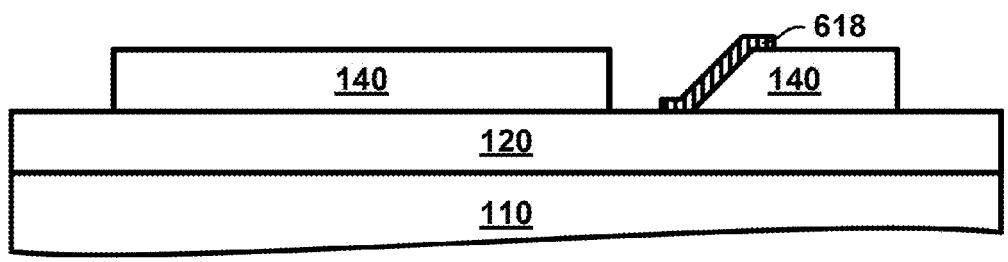
Figure 6D:
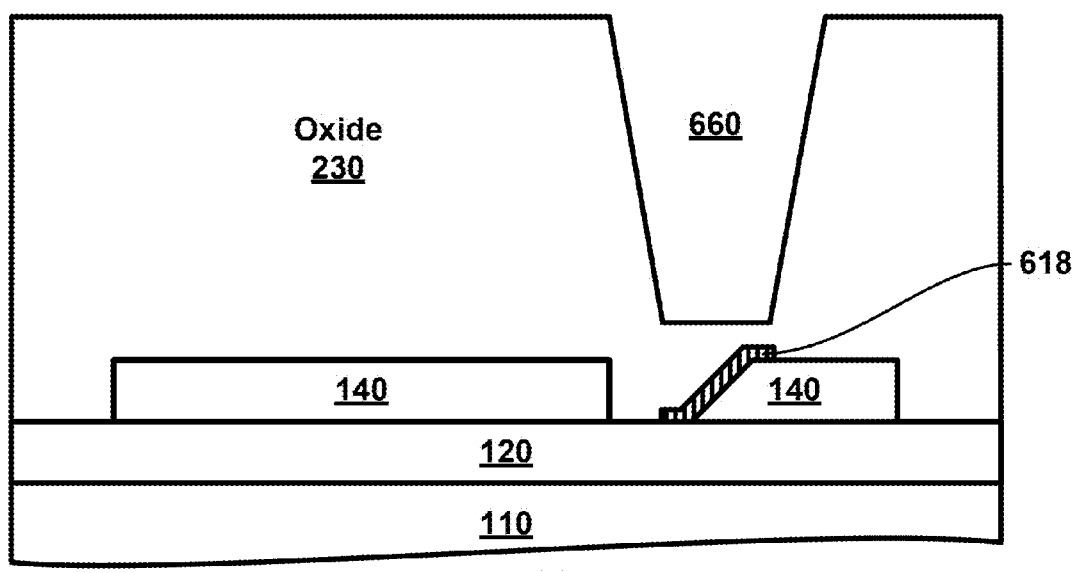
Figure 7:
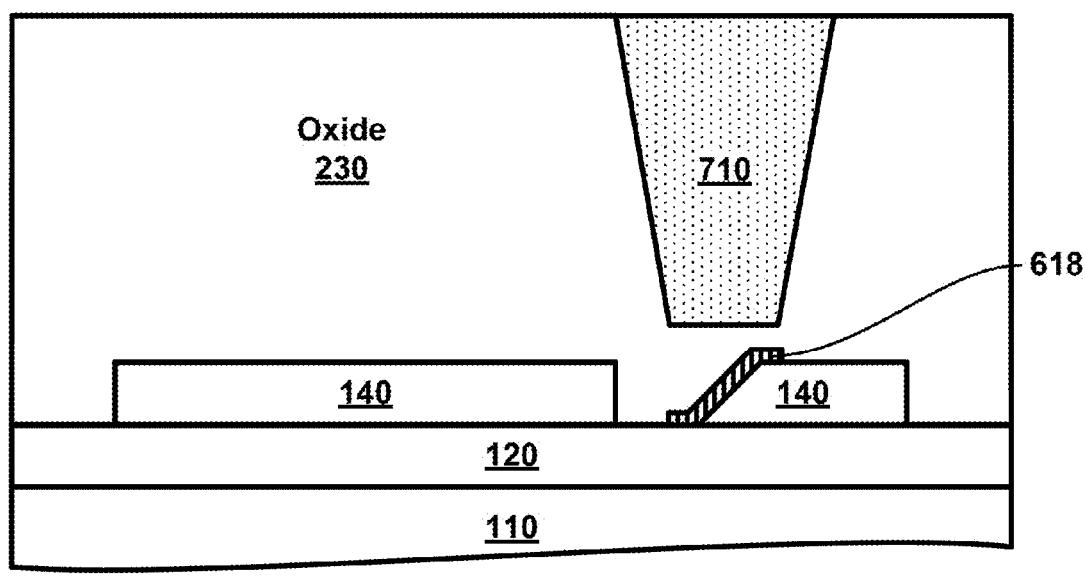

Tapered waveguides 261 and/or 262 may be constructed as vertical optical vias to achieve input/output optical coupling with external optical fibers. Tapered waveguides 261 and/or 262 may be vertically tapered waveguides used as spot size converters to reduce the mode field diameter (MFD) from the fiber to the SOI waveguide or vice-versa. Alternatively, tapered waveguides 261 and/or 262 may be referred to as vertical spot size converters (VSSC) or optical vias. The dimensions of such a vertical taper waveguide 261 and/or 262 may be flexible and depend on several factors such as sizes of the SOI waveguide and the external fiber as well as the thickness of the required overlaying oxide or ILD layer. In general the waveguide input/output apertures could range from 1-10 um and 0.1-1 um for the wide and narrow ends, respectively. The height of the waveguide could be from 5-30 um, or even more. Examples of optical materials that can be used to form the vertical waveguide taper are polymers and SixONy. However, other suitable materials may be used as well. Example process flows for the fabrication of tapered waveguides 261 and/or 262 is shown in FIGS. 6A through 7. An alternative method for the formation of the vertical waveguide taper may be to employ laser direct writing discussed in Nieto et al. (referenced earlier). Additionally, laser ablation techniques may be employed as discussed in K. H. Chen, WenhsingWu, Byung Hwan Chu, C. Y. Chang, Jenshan Lin, S. J. Pearton, D. P. Norton, F. Ren, App. Surf. Sc. 256 (2009) 183-186.

As shown in FIG. 2 and FIG. 3, an optical signal 206 received from a first optical fiber may have an optical path 270 through the illustrated example embodiment. The optical signal 206 may enter the illustrated apparatus through tapered waveguide 261 and reflected approximately ninety degrees by mirror 251 and/or 351 along silicon waveguide structure 241 and/or 242. Some embodiments may have components 290 configured to receive signal 206. In yet other embodiments, silicon waveguide structure 241 may be connected to, or may be the same as, waveguide structure 242. A processed signal 207 may be emitted from components 290 and projected down the silicon waveguide 142 and reflected approximately ninety degrees by mirror 252 and/or 352 through tapered waveguides 262 to a second optical fiber.

Figure 4:
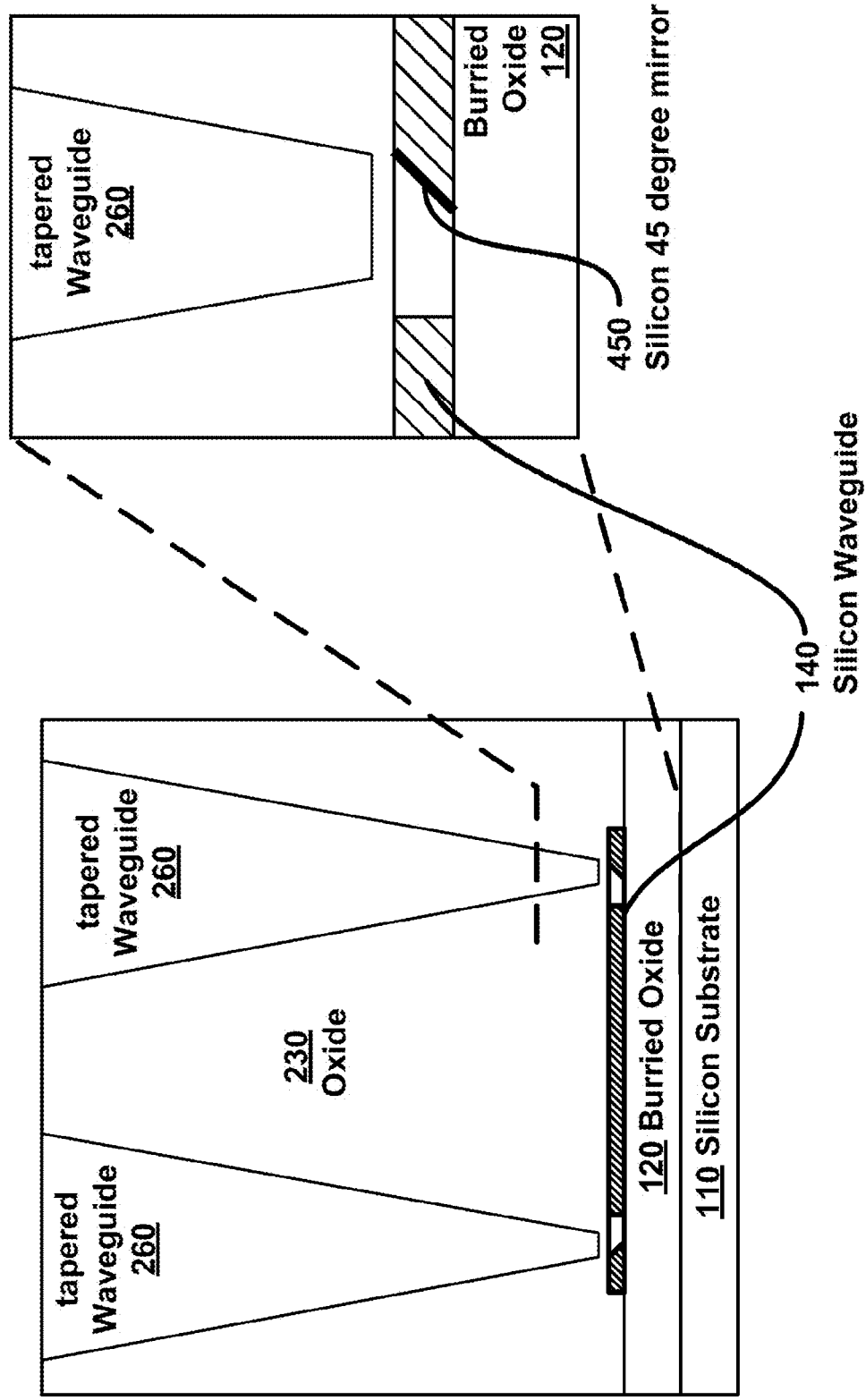
Figure 5:
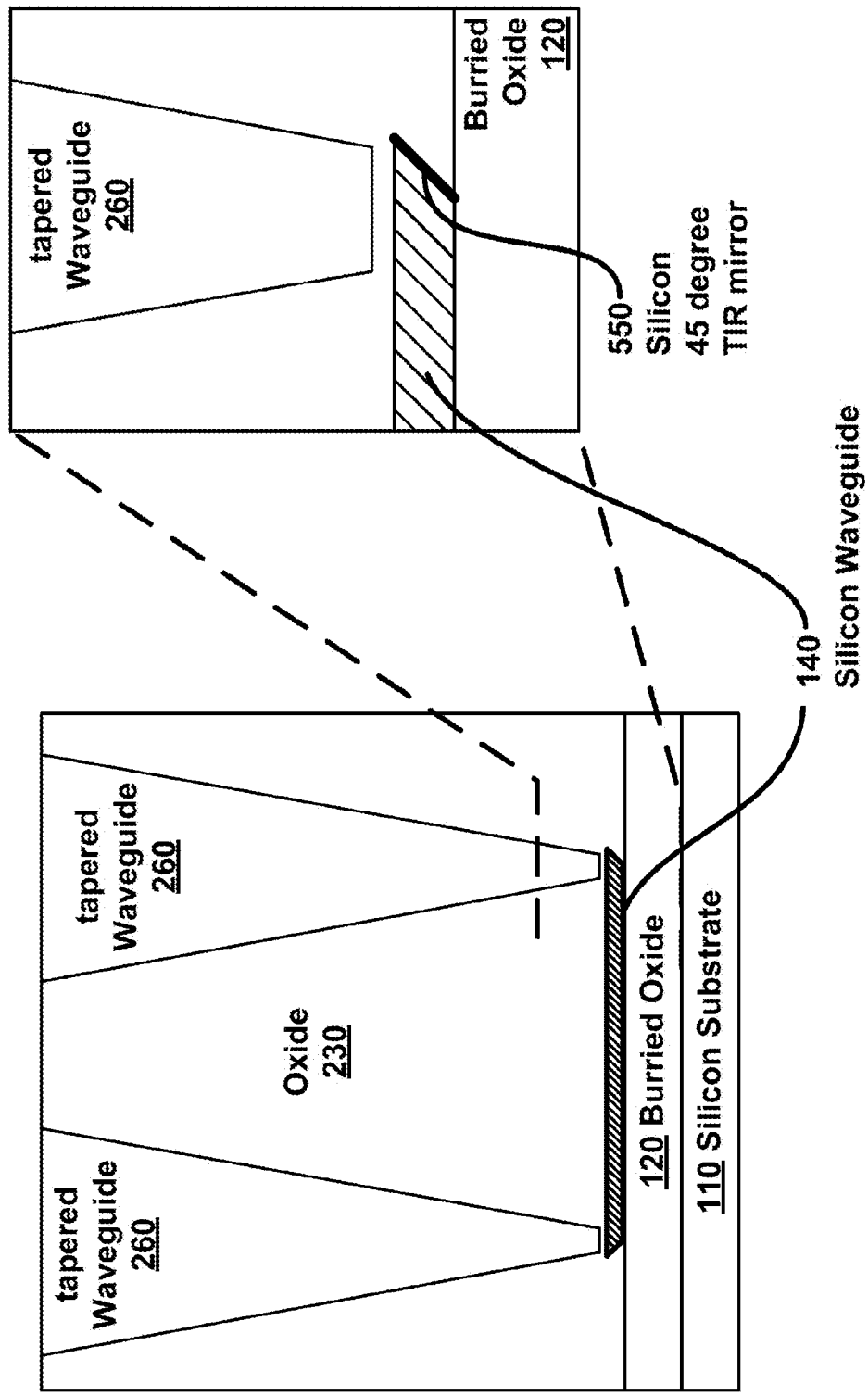

The figures are intended to illustrate the concepts of the invention. However, one skilled in the art will recognize that the elements of the apparatus may be constructed with various dimensions of the waveguide may vary depending upon depending on particular requirements. For example, the silicon waveguide structure(s) 241 and/or 242 may vary in size to match the components 290. The Tapered waveguide(s) 261 and/or 262 may be sized to the silicon waveguide structure(s) 241 and/or 242 on one end and to the size of an external fiber and/or external fiber connector on the other end. FIGS. 4 and 4 illustrate examples of how the sizes of the elements may differ, especially when compared to FIGS. 2 and 3. Specifically, FIG. 4 shows the relative differences of the individual components in an example apparatus using external mirror(s) 450. In contrast, FIG. 5 shows the relative differences of the individual components in an example apparatus using total internal reflection (TIR) mirror(s) 550.

Some characteristics of the presently disclosed embodiments include: (1) disclosed embodiments may eliminate the fabrication of mode expanders or spot size converters on the surface of the PLC; (2) disclosed embodiments may avoid the use of multiple planar waveguides in the ILD layer that relay the light signal from the bottom to the top (PLC) surface; and (3) the use of silicon orientation-etch to form very accurate and atomically smooth 45 degree mirrors may remove the challenge of forming accurate and smooth mirrors on polymer waveguides.

Figure 17:
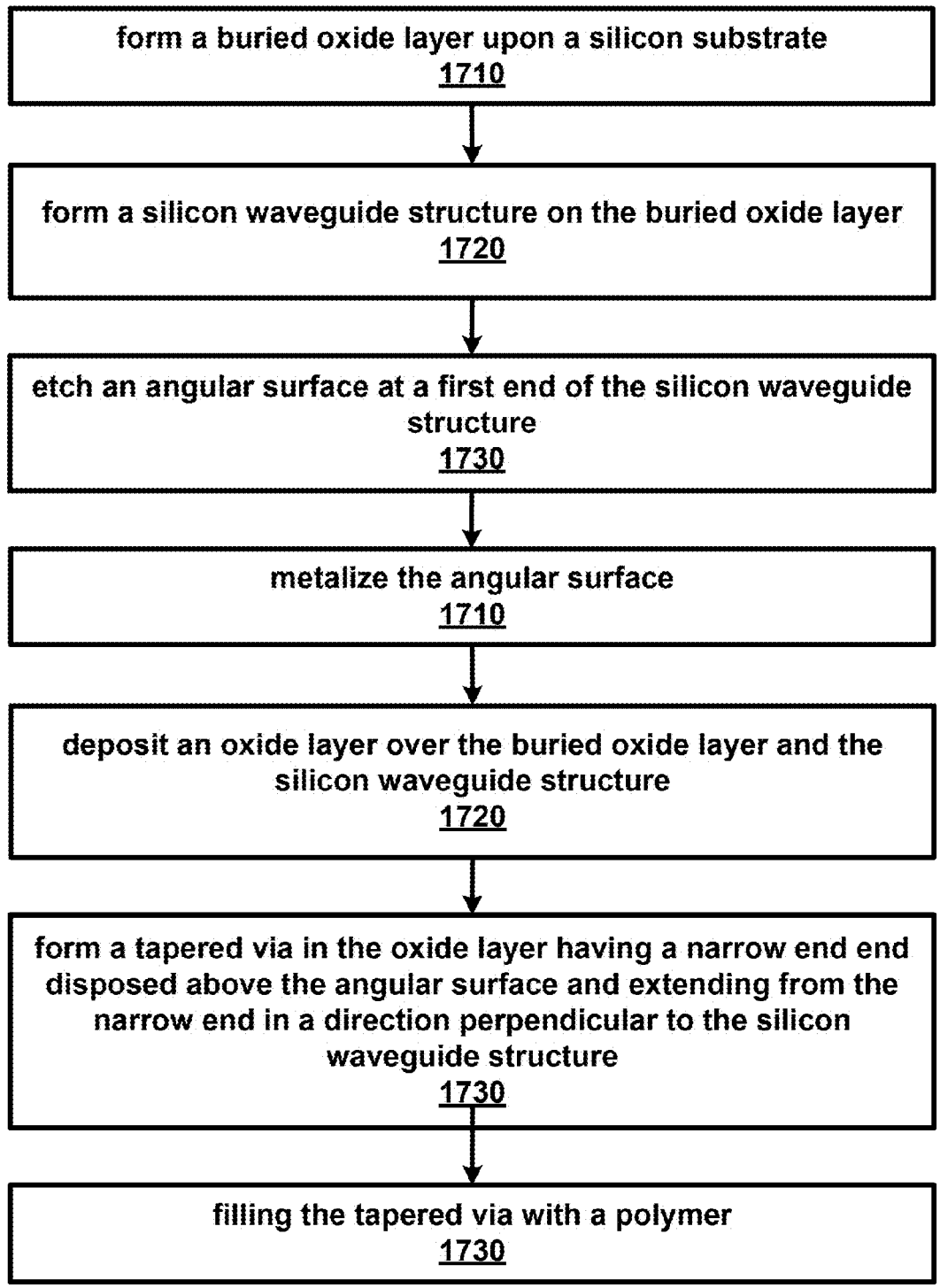
FIG. 17 is a flow diagram of an example process for constructing on-chip optical coupling devices according to aspects of various embodiments of the present invention.

We will now refer to FIGS. 6 through 9 and FIG. 17 to explain example methods for fabricating a silicon on insulator optical coupling system using tapered vertical waveguides according to aspects of various embodiments of the present invention. FIG. 17 is a flow diagram of such as process and FIGS. 6-7 illustrated the structure at various phases of the process. At 1710, an insulating buried oxide layer 120 may be formed on a silicon substrate 110. A Silicon waveguide structure(s) 140 may be formed upon the buried oxide layer 120. This basic structure is illustrated in FIG. 6A. As illustrated in FIG. 6B, an angular surface 610 may be etched upon a first end of the silicon waveguide structure 140 at 1730. As part of an example etching process, an oxide layer 612 may be deposited upon the structure of FIG. 6A and a nitride layer 614 may be deposited upon the oxide layer 612. These layers may act as a mask for enable the etching of the angular surface 610. The angular surface may be etched to be approximately forty-five degrees. The etching may be accomplished using a Si orientation etching is described in Nieto et al. and PCT patent Publication No. WO/2011/037742, entitled "vertical mirror in a silicon photonic circuit."

At 1710, a mirrored surface 618 may be created by metalizing angular surface 610 with a metallic material such as aluminum, silver, gold, a combination thereof, and/or the like. FIG. 6C illustrates the metalized coating 618 on the angular surface 610. At 1720, an oxide cladding 230 may be deposited over the buried oxide layer 120 and the silicon waveguide structure 140.

A tapered via 660 may be formed in the oxide layer at 1730. The tapered via 660 may have a narrow end and a wide end. The narrow end may be disposed above the angular surface 610 and the tapered via 660 may extend from the narrow end in a direction perpendicular to the silicon waveguide structure 140. This structure is illustrated in FIG. 6D. At 1730, the tapered via may be filled with a polymer 710 as illustrated in FIG. 7. The optical via 660 may be formed using direct laser irradiation. This technique may be employed by either writing the waveguide directly by altering the refractive index or by ablating, forming the via 660, and then back filling the via 660 with higher index material.

Figure 8A:
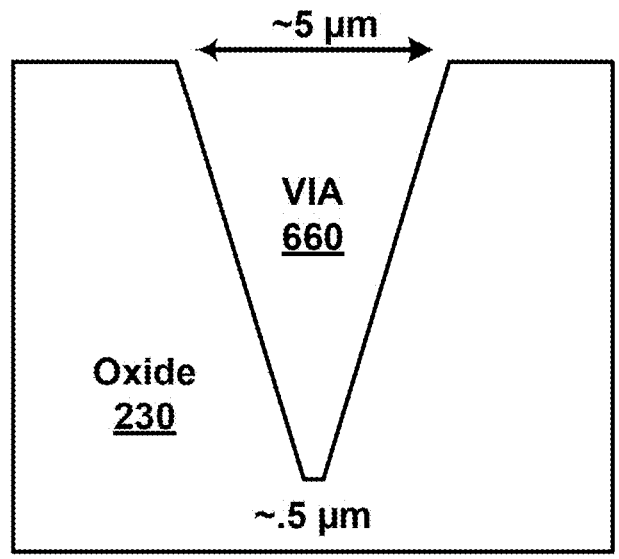
Figure 8B:
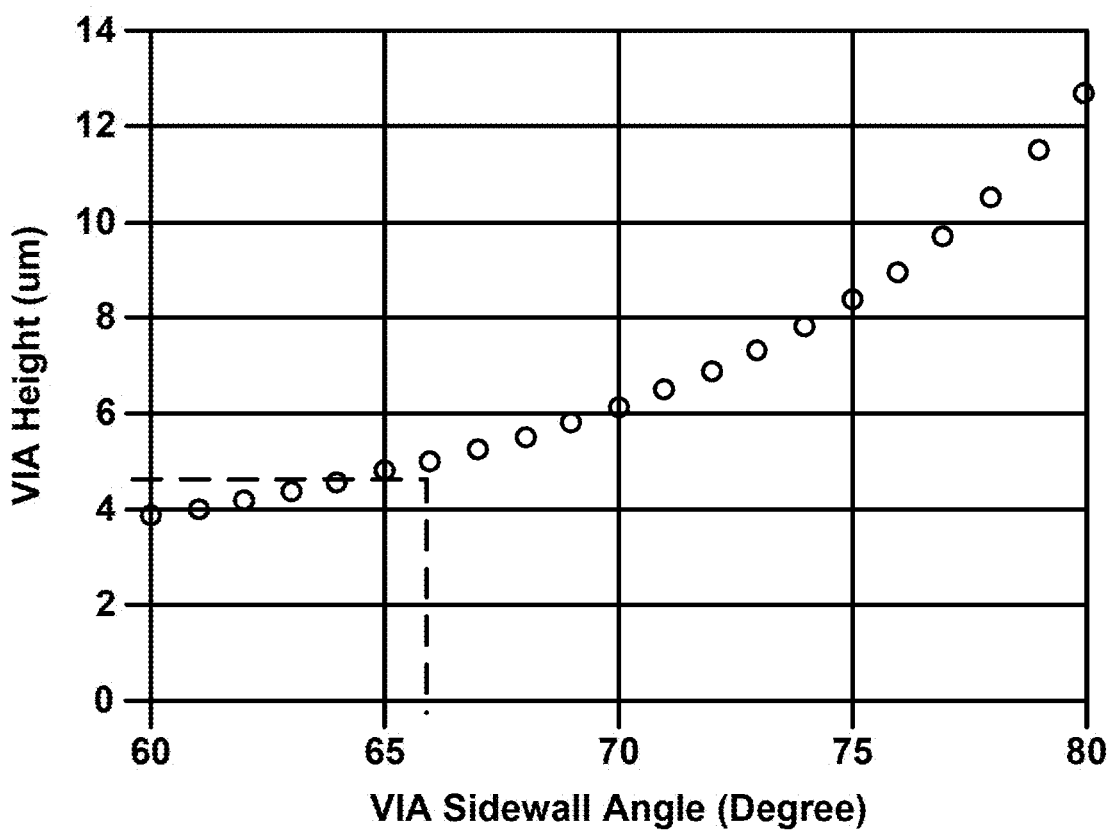

FIG. 8A and FIG. 8B illustrate possible relationships between via height and sidewall angle. FIG. 8A shows an example via having a narrow end that is approximately 0.5 um and a wide end of approximately 5 um. These sizes may vary and may be based upon the size of the silicon waveguide structure 140 and the size of the external fiber. These relationships are illustrated in the graph in FIG. 8B.

Figure 9:
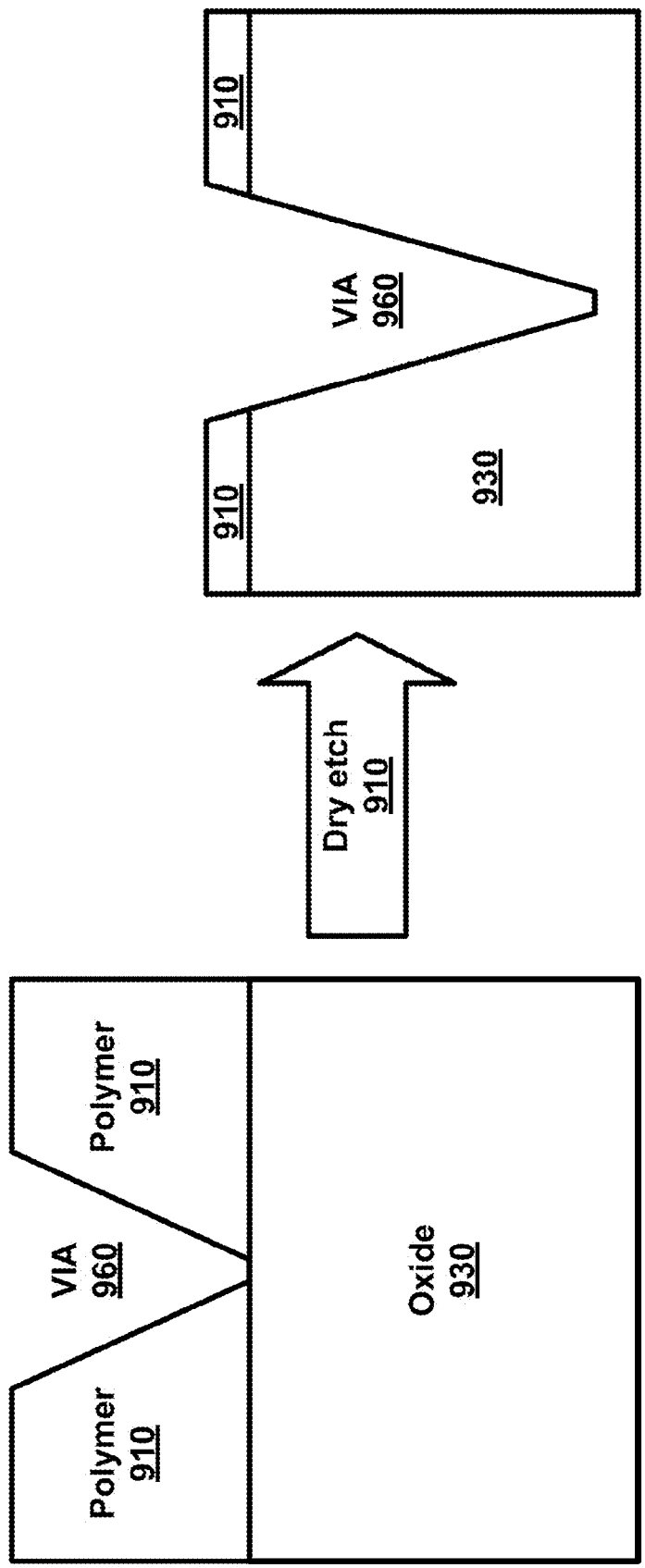

FIG. 9 illustrates a dry etch 910 via pattern transfer using polymers 910. The example illustrated method may transfer the v-pattern using polymers 910. In principle, the sidewall angle formed using dry etch chemistries may be engineered (more polymerization, less sputtering power, etc.) to the target. Existing polymers may also lend themselves for pattern transfer process as shown above the starting angle. The relative etch rates of the polymer 910 and the oxide 930 may determine the VIA angle. Polymer angle can also be adjusted by lithographic conditions.

Figure 10B:
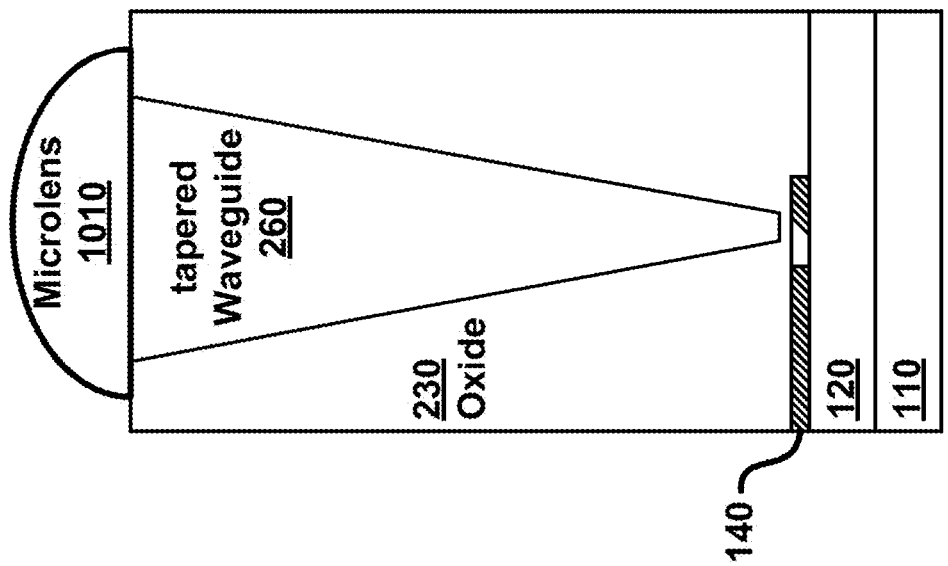
FIGS. 10-11 are a diagrams illustrating example on-chip optical coupling devices with microlens according to aspects of various embodiments of the present invention.
Figure 10A:
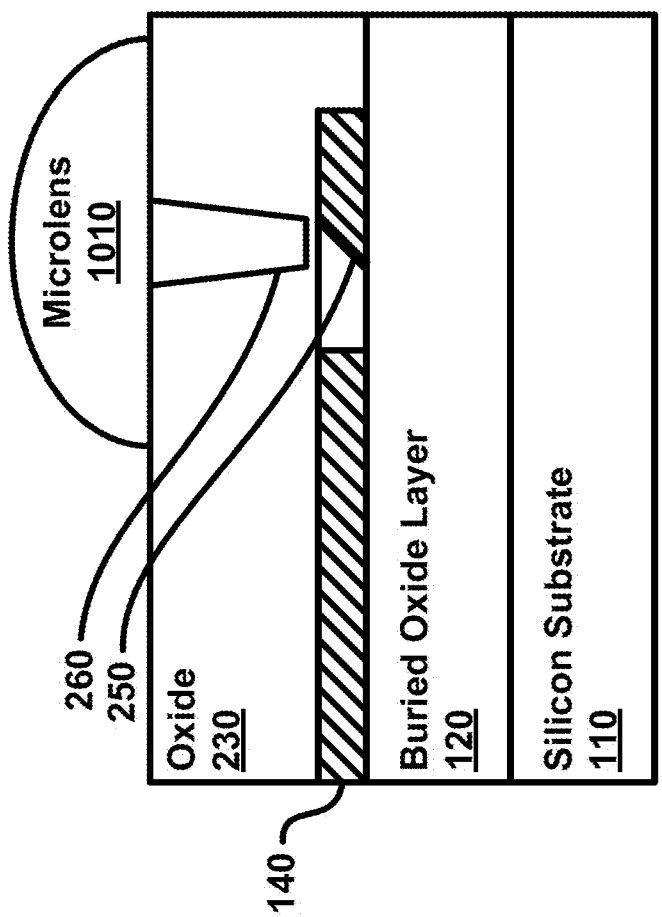
Figure 11:
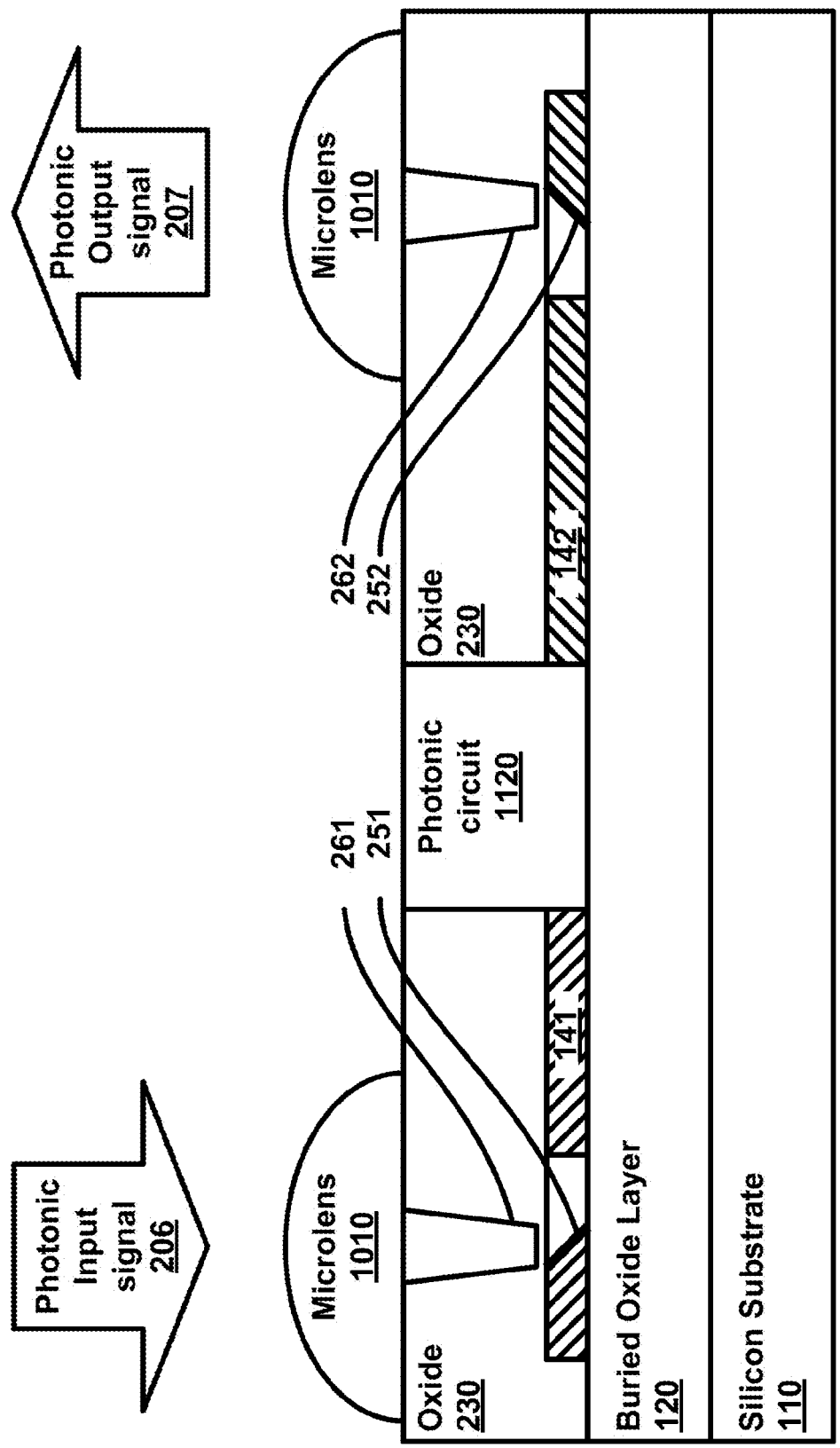

FIG. 10 through FIG. 11 are diagrams illustrating example on-chip optical coupling devices with microlens 1010 according to aspects of various embodiments of the present invention. In these examples, microlens 1010 may be fabricated on the top of the vertical waveguide 260. A microlens is a small lens, generally with a diameter less than a millimeter (mm) and often as small as 10 micrometers (μm). A typical microlens may be a single element with one plane surface and one spherical convex surface to refract the light. Because microlenses are so small, the substrate that supports them may be thicker than the lens and this may have to be taken into account in the design. More sophisticated lenses may use aspherical surfaces and others may use several layers of optical material to achieve their design performance. As illustrated, the microlens are convex shaped to allow light to be distributed in an optic fiber. However, one skilled in the art will recognize that other shaped microlens 1010 may be employed to satisfy specific optical transfer requirements. FIGS. 10A and 10B are again illustrating the variation in size construction that may be required to construct operational coupling systems. FIG. 11 illustrates a structure similar to FIG. 2, but with the addition of a microlens 1010 above each of the tapered waveguides 261 and/or 262.

Optical simulation experiments were carried out using example embodiments to estimate the total insertion loss of such an architecture. An optical via with a height of ~10 um was filled with a material with an index of refraction ~1.6. The total insertion loss for the full optical path was calculated to be ~4 dB. For the optical path with a TIR mirror, the insertion loss value decreased to ~3 dB. Fabrication of a microlens on the top of the waveguide taper may further reduce the insertion loss value.

The structures disclosed so far may be assembled such that the tapered waveguides 261 and/or 262 are part of an optical source/lens array. This configuration may make it efficient to couple multiple optical signals from planar lightwave circuits (PLCs) to external optical fibers. The optical source/lens arrays may be further configured in rows and columns to increase the density of coupled optical signals over more traditional horizontally optical coupled methodologies.

To couple the signals from PLCs to external optical fibers may require an external optical coupling connector. FIG. 12 through FIG. 16 are diagrams of example external optical connector couplers that optically couple vertically emitting optical sources and waveguide arrays located on a photonic chip or substrate to off-chip coupling to an external fiber array. Several of the embodiments include a fiber optic connector assembly aligned to a photonic substrate that turns optical signals from vertically emitting source arrays to the lateral direction.

Figure 12:
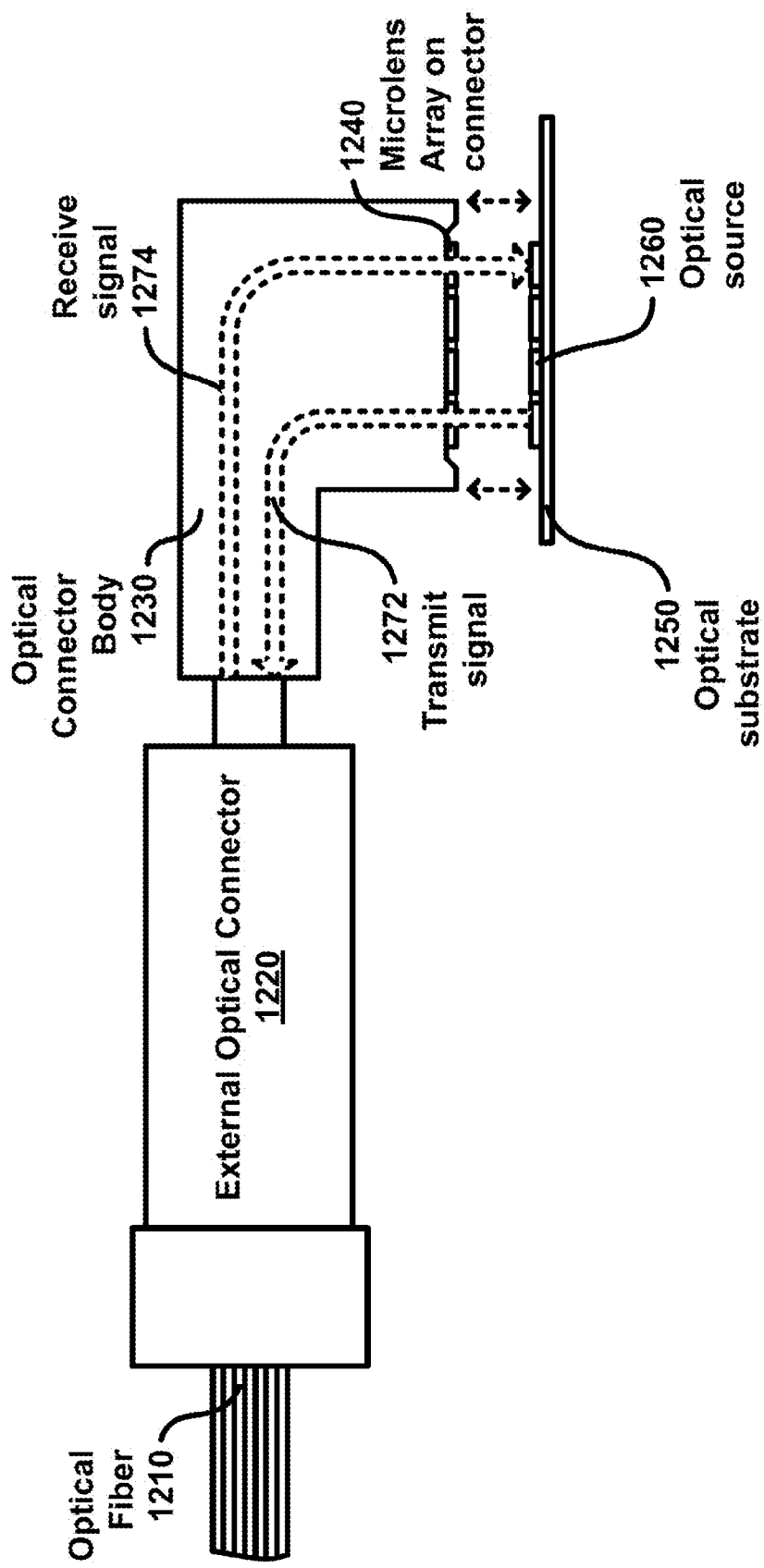
FIGS. 12-16 are diagrams of an example external optical connector couplers according to aspects of various embodiments of the present invention.

FIG. 12 illustrates an example external optical coupling connector coupling external optical fibers 1210 to an optical substrate 1250. Through external connector 1220 and optical connector body 1230. The optical substrate 1250 may have an array of optical sources 1260 that may include optical receivers and transmitters. Employing this apparatus, receive signals 1274 and transmit signals 1272 may travel between the optical sources 1260 and optical fibers 1210.

Figure 13:
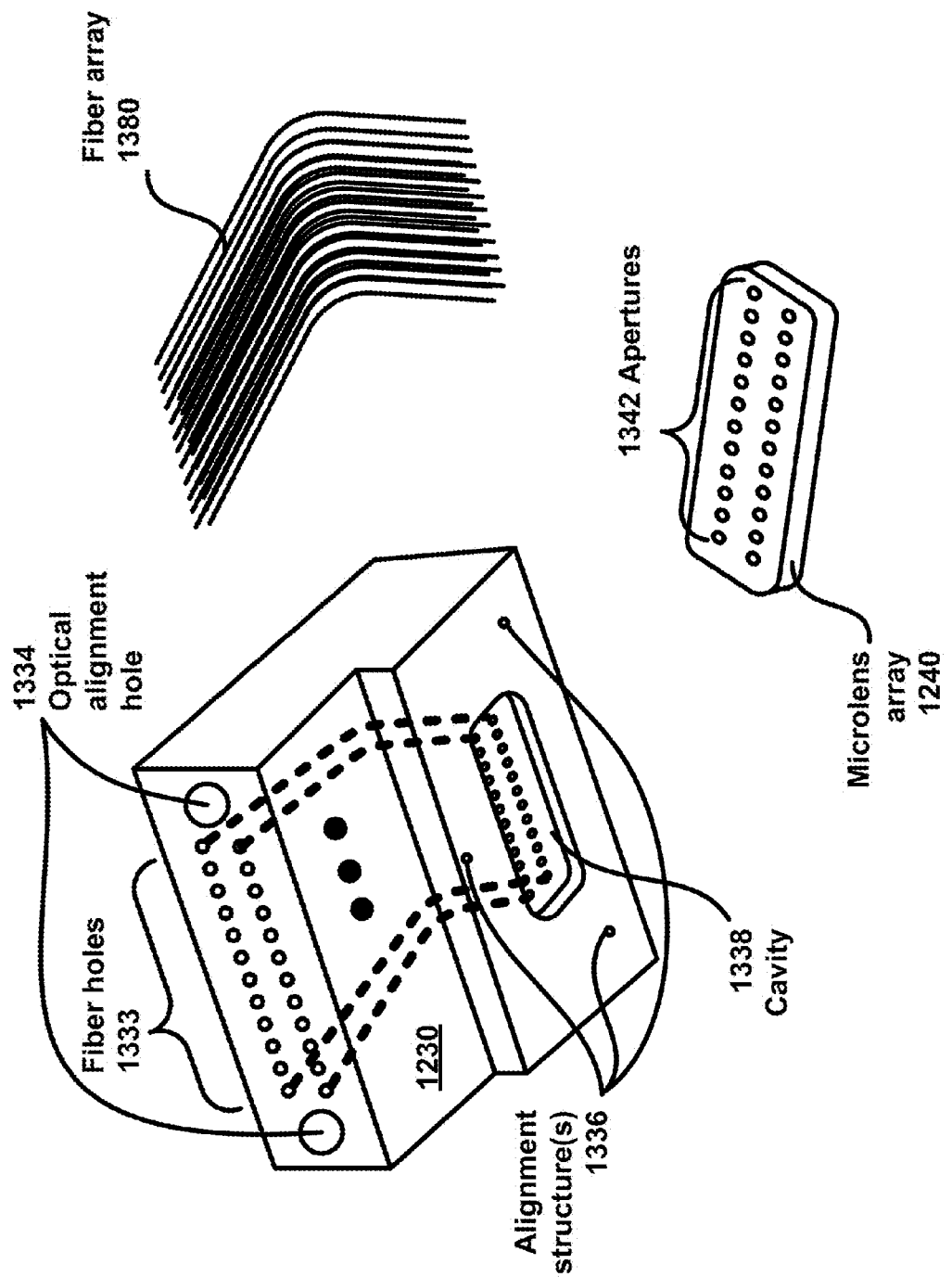

FIG. 13 provides a diagram of several components for embodiments of the external optical coupling connector. These components include a connector body 1230, an array of fiber holes 1333, one or more optical fibers 1380, a microlens array 1240, and one or more alignment structures 1334 and/or 1336.

The connector body 1230 may be a high-precision connector unit (HPCU) with fiber holes that bend approximately ninety degrees for inserting and aligning fiber arrays 1380. The array of fiber holes 1333 may be two dimensional having n rows and m columns. Alternatively, the array may have non rectangular configurations such as fiber holes spaced around a center point.

The connector body 1230 may be manufactured using various materials such as glass, thermoplastic, thermoset, etc. The connector body 1230 may provide a mechanism for mating to an optical connector 1220 along the vertical surface. An optical fiber connector terminates the end of an optical fiber, and enables quicker connection and disconnection than splicing. The connectors mechanically couple and align the cores of fibers so light can pass. Better connectors lose very little light due to reflection or misalignment of the fibers. An example of an optical connector is an MT optical connector. Optical alignment holes 1334 may be employed to provide a semi/automatic mating capability to an external connector such as an MT connector.

In this disclosure, the terms horizontal and vertical are being used as relative references in the sense that a vertical surface is relatively perpendicular to a horizontal surface. For example, the surface of a substrate may be interpreted as being a horizontal surface. A surface perpendicular to the substrate surface may be referred to as a vertical surface. In other words, the terms horizontal and vertical are not being used as absolute references.

Alignment structures 1336 to the substrate on the horizontal surface of connector body 1230 may be provided. For example, alignment structures 1336 may be 3 hemispheres as illustrated in FIG. 13. However, the number, type and configuration of these structures may take various forms depending on the specific application and photonic mating substrate used. The alignment structures 1336 along the horizontal surface may optically align the microlens array with an array of tapered waveguides on a photonic substrate.

The array of fiber holes 1333 may extend through the connector body from the horizontal surface to the vertical surface. The one or more optical fibers 1380 may extending through each of the fiber holes 1333 from the horizontal surface to the vertical surface. The fiber array 1380 maybe bent at approximately ninety degrees so that the fibers 1380 may be inserted in to the connector body 1230. In some embodiments, the fiber array 1380 may not be bent and a straight fiber array used. The number of fibers in a fiber array 1380 may follow number of fiber holes 1333.

The microlens array 1240 may terminate one or more of the fiber holes 1333 at the horizontal surface. The microlens array 1240 may be molded, fabricated in a semiconductor type of process, or other similar process. The number of lens in microlens array may be determined by the number of fibers in the fiber array 1330. Microlenses may be fabricated on both sides of apertures 1342 on the microlens array 1240 for collimation and focusing of the optical signal.

Figure 14:
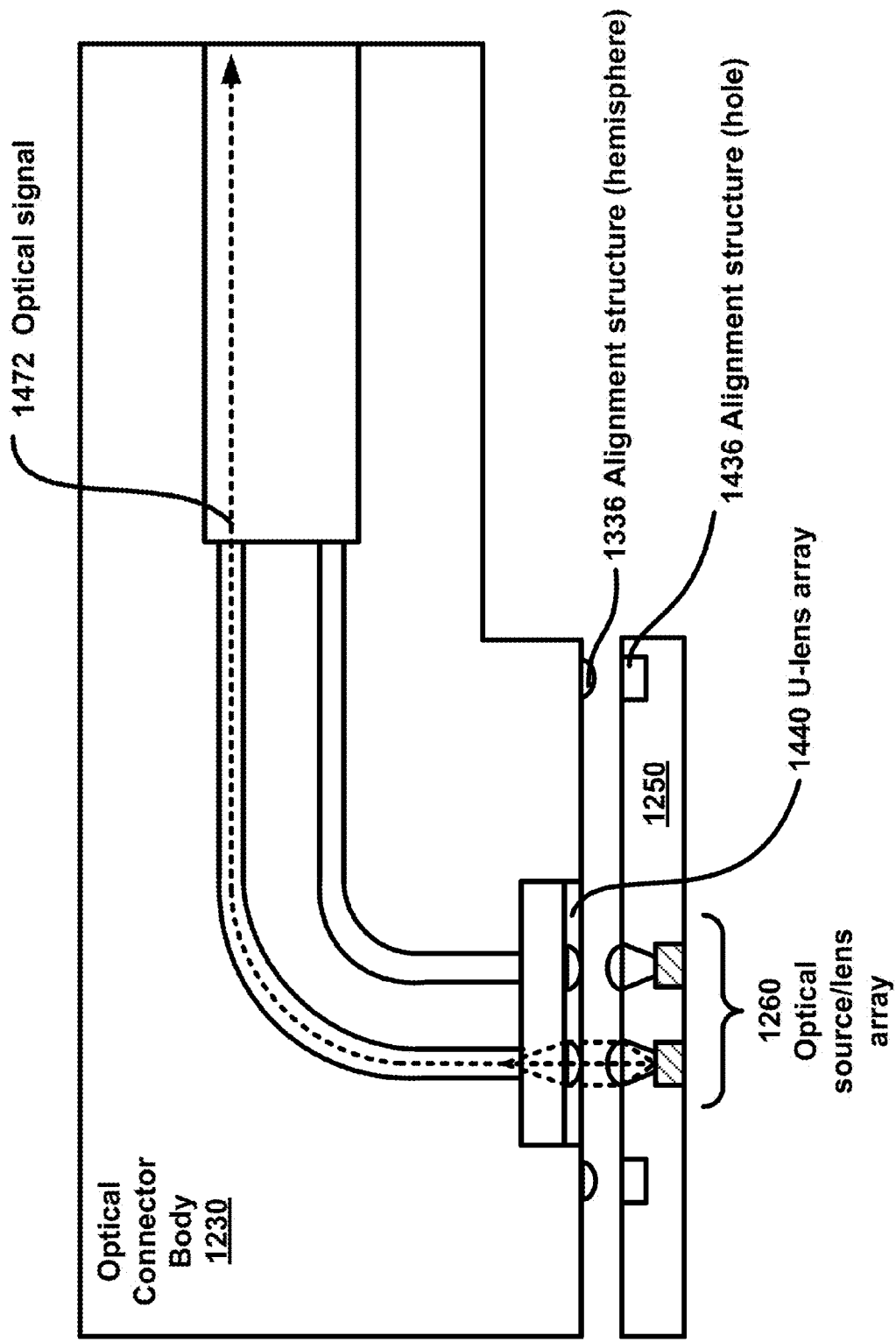

FIG. 14 is a side view of an embodiment of the present invention. As shown for optical transmission, the optical connector body 1230 may be aligned to a photonic substrate 1250 using respective alignment structures on both the substrate (holes) 1436 and at the bottom of the connector 1336 (hemispheres) and secured. Securing to the substrate 1250 may be achieved either by epoxy attachment or by mechanical retention mechanism (Normal force on the top of the substrate). In the arrangement shown below, the substrate 1250 may contain vertically emitting sources (lasers, waveguides etc.) coupled to a collimating microlens array 1260. The microlens on substrate may collimate the optical signal 1472 and the signal captured by the focusing microlens 1440 on the optical connector 1230 without significant propagation in free-space. The signal 1472 may be focused on to the fiber end face for propagation. The signal travels through the fiber and turns ninety degrees to be received laterally off-chip. Depending on the focal length of the respective lens arrays 1440, the optical beam may be expanded 10 to 15 times. The beam expansion may increase the alignment tolerance. Also, since the collimated beam may be captured without significant propagation through free-space, small tilt in the vertically emitting light source 1260 may be tolerated.

Alternative arrangements of the above may include (1) both the collimating and focusing lens arrays to be on the connector side only with no lens array on the substrate (2) both the collimating and focusing lens may be on the substrate side with no lens array on the connector (3) integration of microlens arrays on the connector may be done at the front end face of the connector as well; and (4) microlens arrays may not be separate entities to be aligned to a connector but may be fabricated in one step with the rest of the connector unit.

Figure 15:
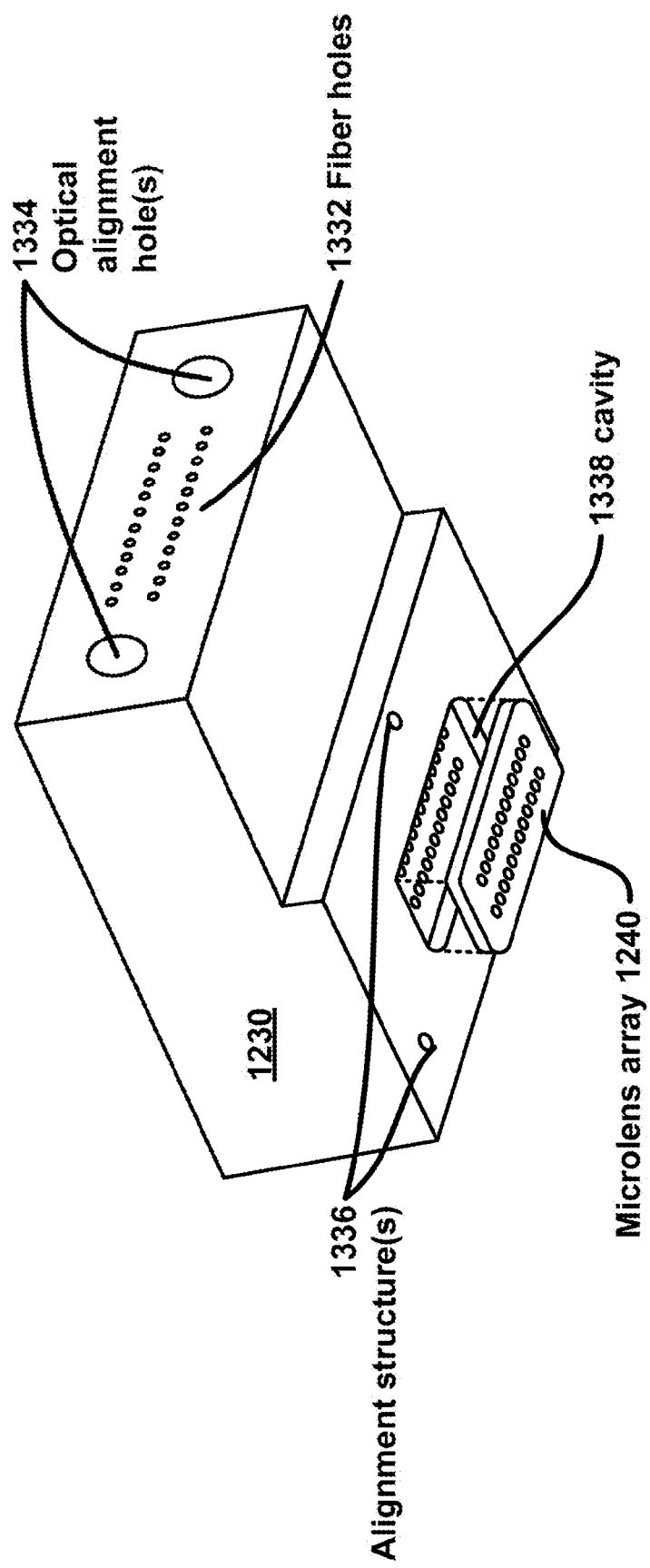
Figure 16:
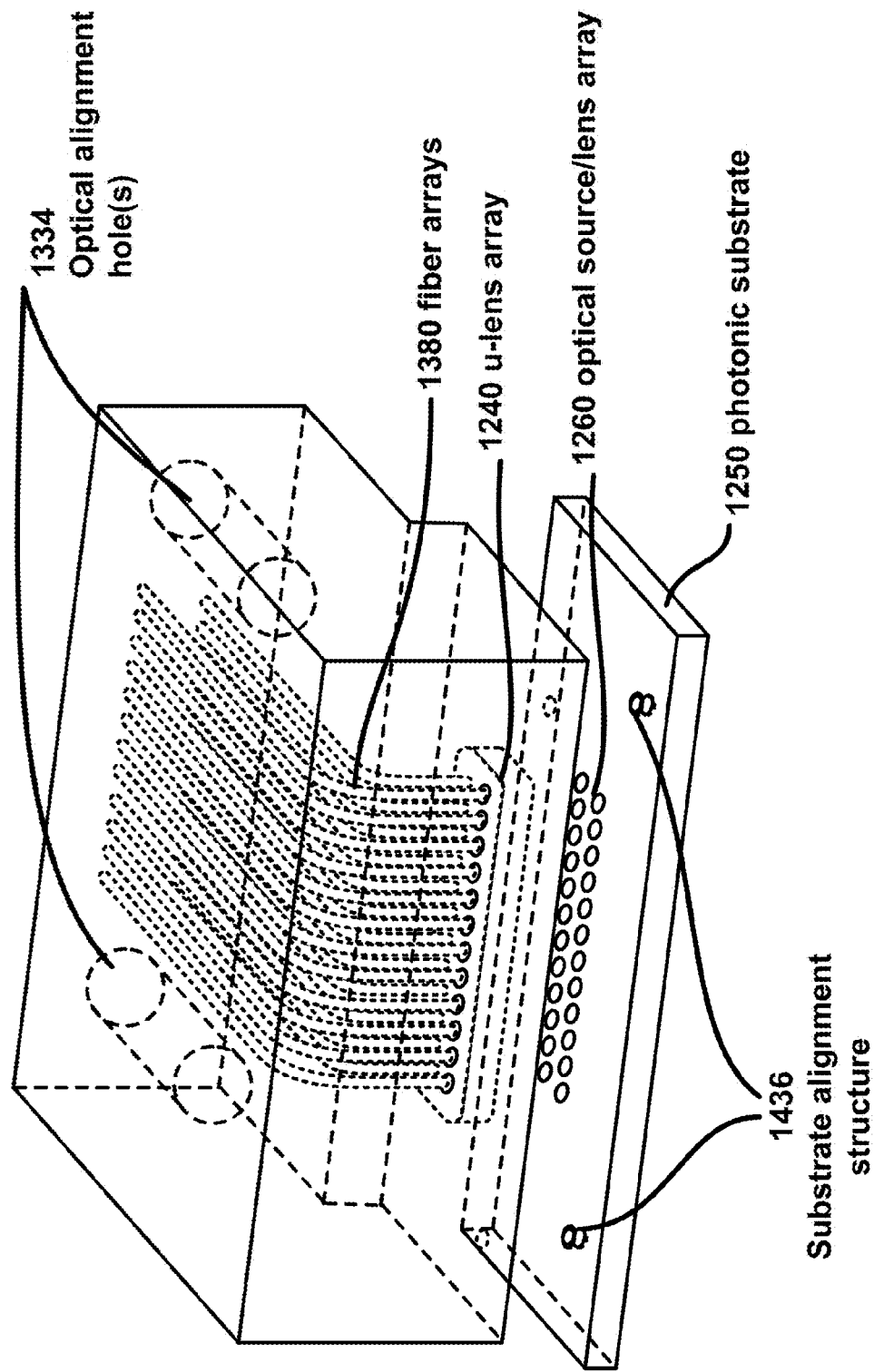

FIG. 15 and FIG. 16 provide alternative views of embodiments of the present invention discussed above. Specifically, FIG. 15 shows a perspective view looking down at connector body 1230. FIG. 16 shows a perspective view looking up at connector body 1230 and photonic substrate 1250.

Figure 18:
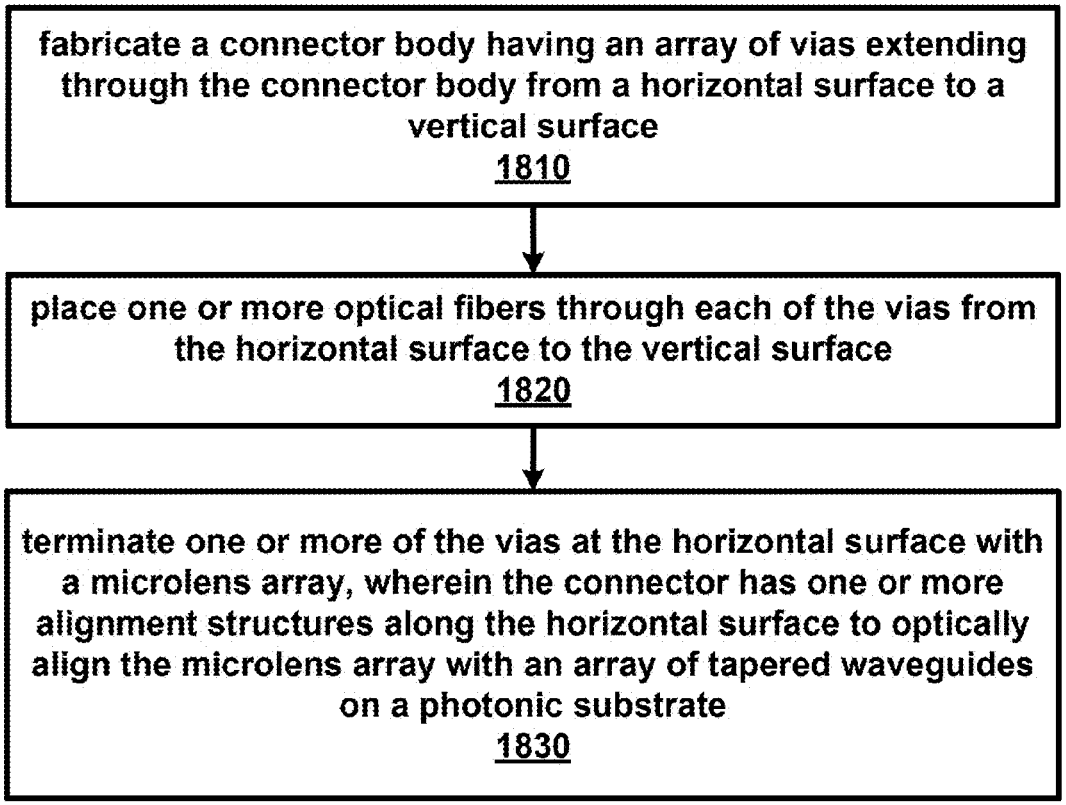
FIG. 18 is a flow diagram of an example process for constructing an external optical connector according to aspects of various embodiments of the present invention.

FIG. 18 is a flow diagram of an example process for constructing an external optical connector according to aspects of various embodiments of the present invention. A connector body may be fabricating having an array of fiber holes extending through the connector body from a horizontal surface to a vertical surface at 1810. One or more optical fibers may be placed through each of the fiber holes from the horizontal surface to the vertical surface at 1820. One or more of the fiber holes may be terminated at the horizontal surface with a microlens array at 1830. The connector may have one or more alignment structures along the horizontal surface to optically align the microlens array with an array of tapered waveguides on a photonic substrate.

The unit may assembled by aligning and inserting cleaved 90 degree fiber arrays 1380 into the fiber holes 1333 (on high-precision connector unit) and terminating them with epoxy at the horizontal and vertical end faces. The end faces may be polished to remove defects at fiber aperture. The lens array 1240, which may have a prefabricated alignment structure on it, may be aligned to cavity 1338 and secured with epoxy at the edge.

According to some of the various embodiments, a fiber optic connector assembly with microlenses 1240 may be aligned to a substrate 1250 containing vertically emitting device 1260, by using respective mating structures on both the substrate 1250 and the connector body 1280. The optical signal may be coupled to the fiber by means of the microlens array 1240 which focuses signal on fiber aperture. The signal may propagate through the fiber, turns 90 degree and couples laterally out of the connector body 1230 for off-chip coupling.

The various components shown in FIGS. 12 through 16 may be separately fabricated as described below. The connector is assembled by aligning and inserting cleaved 90 degree fiber arrays 1380 into the fiber holes 1333 (on high-precision connector unit) and terminated with epoxy at the vertical and horizontal end faces. If needed, the end faces may be polished to remove defects at fiber aperture. The lens array 1240, which may have a prefabricated alignment structure on it, may be aligned to the cavity 1338 and secured with epoxy at the edge.

In this specification, "a" and "an" and similar phrases are to be interpreted as "at least one" and "one or more." References to "an" embodiment in this disclosure are not necessarily to the same embodiment.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

We claim:

1. An apparatus, comprising:
   a silicon substrate;
   a buried oxide layer disposed upon the silicon substrate;
   a silicon waveguide structure dispose on the buried oxide layer;
   a mirror structure angularly disposed at a first end of the silicon waveguide structure;
   an oxide layer covering the buried oxide layer and the silicon waveguide structure;
   a tapered waveguide having a narrow end and a wide end, the narrow end disposed above the mirror, the tapered waveguide extending through the oxide layer from the narrow end in a direction perpendicular to the silicon waveguide structure; and
   an optical element aligned with a second end of the silicon waveguide structure, wherein the mirror is angularly disposed at approximately 45 degrees relative to both the tapered waveguide and the silicon waveguide structure.

2. The apparatus according to claim 1, wherein the optical element is one or more of an optical transmitter and an optical receiver.

3. The apparatus according to claim 1, further including a microlens terminating the wide end of the tapered waveguide.

4. The apparatus according to claim 3, wherein the microlens is configured to mate with a lensed fiber.

5. The apparatus according to claim 1, wherein the mirror is an internal total internal reflection mirror.

6. The apparatus according to claim 1, wherein the mirror is an external mirror.

7. The apparatus according to claim 1, wherein the tapered waveguide is positioned within an array of tapered waveguides.

8. The apparatus according to claim 1, wherein the optical element includes one or more optical amplifiers.

9. An apparatus, comprising:
   a silicon substrate;
   a buried oxide layer disposed upon the silicon substrate;

a silicon waveguide structure dispose on the buried oxide layer;
a mirror structure angularly disposed at a first end of the silicon waveguide structure;
an oxide layer covering the buried oxide layer and the silicon waveguide structure; and a tapered waveguide having a narrow end and a wide end, the narrow end disposed above the mirror, the tapered waveguide extending through the oxide layer from the narrow end in a direction perpendicular to the silicon waveguide structure.

10. The apparatus according to claim 9, further including an optical element aligned with a second end of the silicon waveguide structure.

11. The apparatus according to claim 10, wherein the optical element is one or more of an optical transmitter and an optical receiver.

12. The apparatus according to claim 10, wherein the optical element includes one or more optical amplifiers.

13. The apparatus of claim 9, further including a microlens terminating the wide end of the tapered waveguide, wherein the microlens is configured to mate with a lensed fiber.

14. The apparatus according to claim 9, wherein the mirror is angularly disposed at approximately 45 degrees relative to both the tapered waveguide and the silicon waveguide structure.

* * * * *